United States Patent [19]

Sipos

[11] 4,389,144
[45] Jun. 21, 1983

[54] LATHE UNIVERSAL TOOL ASSEMBLY

[76] Inventor: Sandor Sipos, 281 Fillmore Ave., Rialto, Calif. 92376

[21] Appl. No.: 220,452

[22] Filed: Dec. 29, 1980

[51] Int. Cl.³ .................. B23B 27/02; B23B 27/08; B23B 27/16

[52] U.S. Cl. ........................... 407/82; 407/83; 407/89

[58] Field of Search ............... 407/74, 78, 82, 83, 407/84, 88, 89, 95, 96

[56] References Cited

U.S. PATENT DOCUMENTS 1,120,783 12/1914 Amborn ........................... 407/82
1,537,957 5/1925 Marshall ........................ 407/82 X

FOREIGN PATENT DOCUMENTS 75337 of 1894 Fed. Rep. of Germany ........ 407/82
120852 of 1900 Fed. Rep. of Germany ........ 407/82
591969 of 1959 Italy ............................... 407/82
332557 of 1971 Sweden ........................... 407/82
17506 of 1909 United Kingdom ................. 407/82

Primary Examiner—Robert E. Garrett
Assistant Examiner—Jerry Kearns
Attorney, Agent, or Firm—Thomas I. Rozsa

[57] ABSTRACT

A cutting tool for use with a lathe includes an elongated body member having a generally rectangular cross section dimensioned and configured for cooperation with an associated tool post. The elongated body member has a head end having a step shaped surface thereon on which is disposed a plurality of generally radially extending ribs disposed at equal angular increments. The ribs extend through an arc of 360 degrees. A first head assembly has a lower extremity which includes a surface having a plurality of generally radially extending ribs disposed at equal angular increments thereabout. These ribs are uniformly spaced and dimensioned and configured for cooperation with the ribs of the body portion. The ribs of the head assembly and the body portion have the same angular spacing therebetween. The head assembly includes discrete means for holding a cutter insert and means for holding the head assembly on the body portion.

11 Claims, 9 Drawing Figures

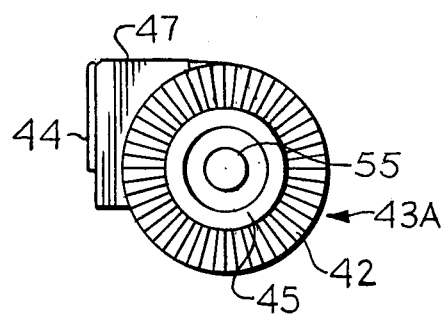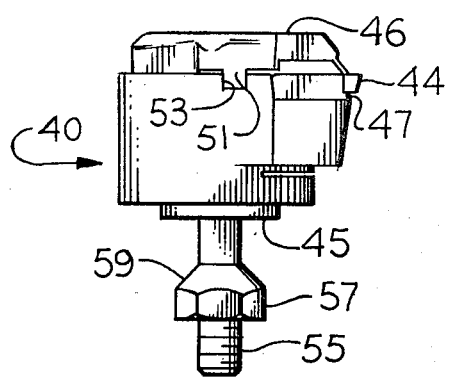

LATHE UNIVERSAL TOOL ASSEMBLY

BACKGROUND OF THE INVENTION

The invention relates to machine tools and particularly to universal tool assemblies for use with lathes. The prior art includes various tool holding apparatus for use with lathes. A common construction is a tool post having a vertically elongated slot which cooperates with a tool which has a replaceable tip or cutting insert.

The prior art also includes the structure disclosed in the applicant's Swedish Pat. No. 332,557. The apparatus disclosed therein provides a substantial improvement over the structures known previously. However, this apparatus has less adjustment range than is desirable and in addition one screw, which extends from the top of the assembly, holds the entire assembly together. This has the result that when the single screw is loosened the entire assembly comes apart and accordingly the precise angular positioning of the apparatus must again be reset in a time consuming manner.

It is an object of the invention to provide apparatus which is flexible and adaptable to a variety of operating conditions and requirements.

It is another object of the invention to provide apparatus which allows cutting at each degree throughout the entire 360 degree range of possible cutting positions.

It is another object of the invention to enable the removal and replacement of cutting inserts with accurate and rapid repositioning of the tool after replacement of the insert.

Still another object of the invention is to provide apparatus which eliminates the requirement for numerous extra accessories and attachments in order to provide the wide range of tool positions that may be attained with the apparatus in accordance with the invention.

Yet another object of the invention is to provide apparatus which will produce a smooth machined finish which is superior to that which may be obtained with many other tool assemblies.

Yet another object of the invention is to provide apparatus which is simple and inexpensive to manufacture as compared to alternative types of equipment which would achieve the same results.

SUMMARY OF THE INVENTION

The foregoing objects and other objects and advantages which shall become apparent from the detailed description of the preferred embodiment are attained in a cutting tool for use with a lathe which includes an elongated body member having a generally rectangular cross section dimensioned and configured for cooperation with an associated tool post. The elongated body member has a head end having a step shaped surface thereon on which are disposed a plurality of generally radially extending ribs disposed at equal angular increments. The ribs extend through an arc 360 degrees. A first head assembly has a lower extremity which includes a surface having a plurality of generally radially extending ribs disposed at equal angular increments thereabout. The ribs of The assembly are uniformly spaced and are dimensioned and configured for cooperation with the ribs of the body portion. The ribs of the head assembly and the body portion have the same angular spacing therebetween. The head assembly includes discrete means for holding a cutter insert and means for holding the head assembly to the body portion.

The apparatus may further include a reference mark on the body portion and a plurality of discrete spaced reference marks disposed on the head assembly to permit precise alignment therebetween in a plurality of predetermined positions. The apparatus may further include at least one additional head assembly having a lower extemity which has a surface having a plurality of generally radially extending ribs disposed at equal angular increments thereabout. The ribs may be uniformly spaced and dimensioned and configured for cooperation with the ribs of the body portion. The apparatus may have discrete means for holding an associated cutter assembly and means for holding the head assembly in engagement with the body portion. The second head assembly may have means for holding an associated cutting insert at an angular orientation, with respect to the ribs, which is different from the angular orientation at which the associated cutter insert is held by the first head assembly. The difference in angular orientation of the associated cutter, with respect to the ribs, in the second head assembly and the first head assembly may be equal to the angular increment between the teeth in the first and second head assemblies and the base portion. This angular increment between the teeth or ribs may be 6 degrees. The head assemblies may be identified with indicia corresponding to an angle with which the associated cutting insert is disposed when the mark adjacent to the indicia is aligned with an index mark on the body portion.

BRIEF DESCRIPTION OF THE ACCOMPANYING DRAWING

FIGS. 7 and 8 are bottom views respectively of first and second cutter holders or right handed head assemblies which cooperate with the body portions illustrated in FIGS. 1-4; and FIG. 9 is an elevational view of a head assembly illustrated in FIG. 5.

DESCRIPTION OF THE PREFERRED EMBODIMENT

Figure 1:
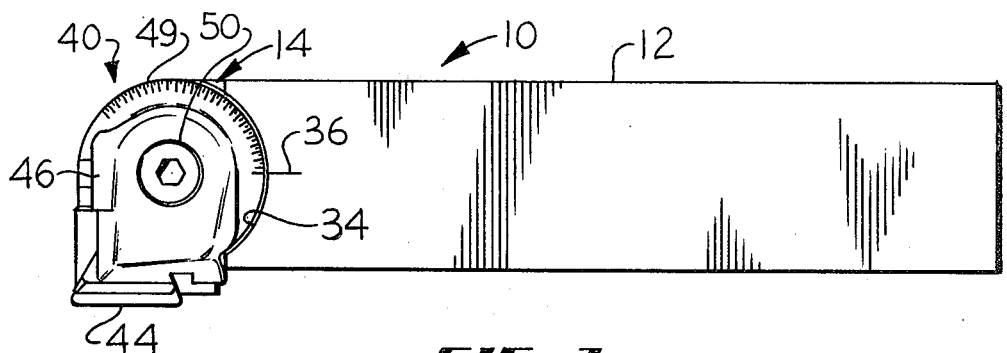
FIG. 1 is a plan view of the assembled apparatus in accordance with the invention.

Referring now to FIG. 1 there is illustrated a cutting tool 10 which includes an elongated generally rectangular cross section body portion 12 which is intended for cooperation with a tool post (not shown) of a lathe type apparatus (not shown). Such apparatus may include screw machines and other apparatus which rotate the work piece.

Figure 2:
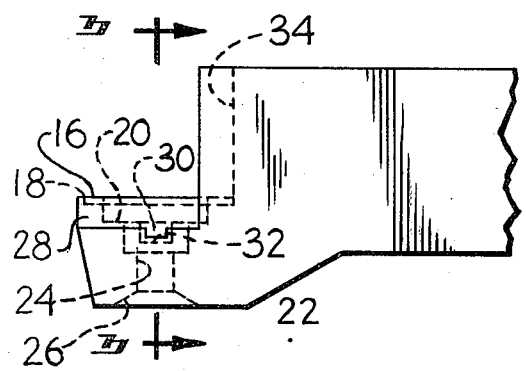
FIG. 2 is a side elevational view of the head end of the body portion of the cutting tool apparatus illustrated in FIG. 1.
Figure 3:
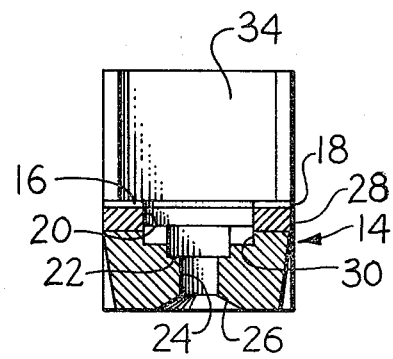
FIG. 3 is a sectional view along the line 3—3 of FIG. 2.
Figure 4:
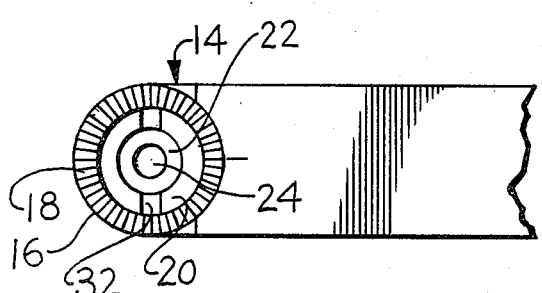
FIG. 4 is plan view of the head end body portion of the cutting tool illustrated in FIG. 1.

The body portion 12 includes a head portion 14 which is further illustrated in FIGS. 2-4.

The head portion 14 includes a generally circular step 16 intended for cooperation, at any one time, with one of the head assemblies illustrated in FIGS. 5-8.

The step 16 is provided with a plurality of radially extending ribs or teeth 18 which are disposed at equal angular increments throughout the 360 degree extent thereof.

The head portion 14 is provided with a first circular recess 20 and a second circular recess 22. The second circular recess 22 is smaller in diameter than the circular recess 20. A central bore 24 extends through the head portion 14 and is axially aligned with both the recess 20 and the recess 22. A recess 26 extends around the lower axial extremity of the central bore 24. In some forms of the invention the radial extending ribs 18 may be manufactured as part of a discrete ring 28 which may have two integral keys 30 (one shown) which cooperate with key ways 32 in the body portion 12 to prevent relative angular rotation between the head portion 14 and the ring 28. An arcuate recess 34 is provided for accommodating the cutter holder or head assembly 40. An index mark 36 is disposed on the body portion 12 as a reference mark for precise positioning of the cutter holder 40 or other alternative cutter holders to be described hereafter.

Figure 5:
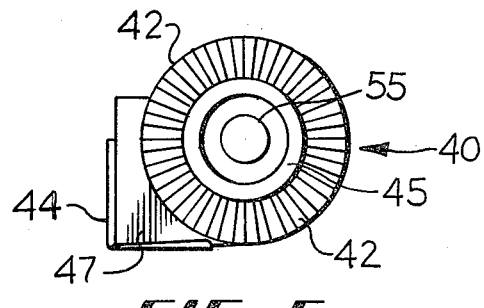
FIGS. 5 and 6 are bottom views respectively of first and second left handed cutter holders or head assemblies which cooperate with the body portion illustrated in FIGS. 1-4.
Figure 6:
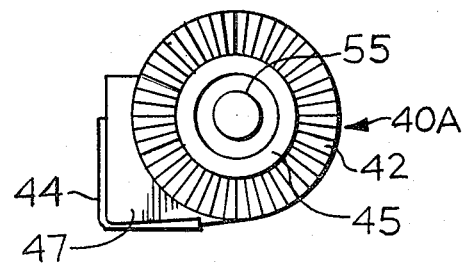

In FIGS. 5-6 there are illustrated first and second cutter holders or head assemblies 40 and 40A. The lower extremity of each of the cutter holders 40 and 40A are provided with a plurality of ribs or teeth 42 which are disposed at equal angular increments and are substantially identical in contour and spacing so that they will cooperate easily with the ribs or teeth 18 disposed on the step 16. The ribs 42 extend throughout the 360 degree extent of the lower extremity of the cutter holders 40 and 40A. In one preferred form of the apparatus in accordance with the invention the interval between successive teeth 42, as well as between successive teeth 18, is 6 degrees. In other forms of the invention other spacings may be provided. For example, a spacing of 3 degrees may also conveniently be utilized.

Figure 7:
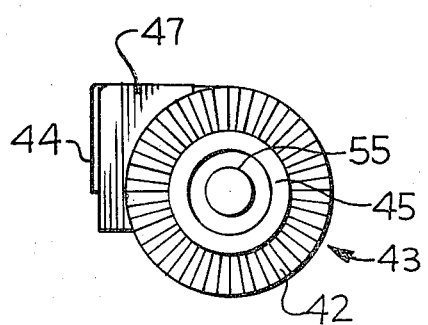

Referring now to FIGS. 7 and 8 there are shown first and second cutter holders or head assemblies 43, 43A which are each provided with radially extending ribs or teeth 42 as are the head assemblies 40, 40A. Each of the head assemblies 40, 40A, 43, 43A is provided with a locating annular boss 45 which engages the recess 30 of the head portion 14. As best seen in FIGS. 1 and 9 each cutter holder 40, 40A, 43, 43A is provided with a cutting plate or insert 44 which is held against the step 47 by means of a retainer 46 which is secured to the step 16 by a set screw 50 having a hexagonal drive surface. The set screw 50 ordinarily will have a head having a lower surface (not shown) which is conical to precisely position the retainer 46.

The assemblies identified by the numerals 40 and 40A differ in that the angular orientation of the retainer 46 and step 47 differs in angular orientation with respect to the ribs 42 thereof. In addition a plurality of index marks 49 are offset in the cutter holder or head assembly 40 from the position of the cutter holder 40A by the same six degree increment. Comparable distinctions exist between the cutter holders 43 and 43A. The precise manner of mounting the cutting plate or insert 44 may vary from one cutter holder to another. A discrete plate shaped member (not shown) may be provided to hold the insert 44. Obviously the contours of the step 47 will vary to accept cutting inserts 44 of different shapes. Although the cutter inserts have each been identified by the numeral 44, it will be understood that such alternative forms may be utilized in head assemblies intended for cutting at different angles. Such inserts may be rectangular, triangular or other geometric forms in various embodiments. The retainer 46 ordinarily will be provided with a key 51 which cooperates with a keyway 53 in the surface of the head assembly. A stud 55 depends from each of the head assemblies 40, 40A, 43, 43A as best shown in FIG. 9.

In the preferred form the apparatus will include six left handed head assemblies and six right handed head assemblies. Each cutter assembly will be provided with a plurality of index marks which are spaced at 6 degree increments. Only two left handed holders have been illustrated and two right handed holders have been illustrated of the preferred six left hand and six right hand assemblies. It has been found advantageous to provide maximum flexibility to provide graduations on each of six left handed assemblies which are each 6 degrees apart. The first assembly will have graduations starting with 0 degrees. A second head assembly will have graduations starting with 1 degree. Similarly the third, fourth, fifth and sixth head assemblies will have graduations starting with respectively 2, 3, 4, and 5 degrees. Six right hand assemblies will be similarly graduated.

The numerical values of the incremental positions for each of the six left hand head assemblies are as follows:

| | Numerical Values |
|---|---|
| (1) | 0, 6, 12, 18, 24, 30, 36, 42, 48, 54, 60, 66, 72, 78, 84, 90. |
| (2) | 1, 7, 13, 19, 25, 31, 37, 43, 49, 55, 61, 67, 73, 79, 85, 91. |
| (3) | 2, 8, 14, 20, 26, 32, 38, 44, 50, 56, 62, 68, 74, 80, 86, 92. |
| (4) | 3, 9, 15, 21, 27, 33, 39, 45, 51, 57, 63, 69, 75, 81, 87, 93. |
| (5) | 4, 10, 16, 22, 28, 34, 40, 46, 52, 58, 64, 70, 76, 82, 88, 94. |
| (6) | 5, 11, 17, 23, 29, 35, 41, 47, 53, 59, 65, 71, 77, 83, 89, 95. |

The numerical values of the incremental positions for each of the six right hand head assemblies are as follows:

| | |
|---|---|
| (1) | 90, 84, 78, 72, 66, 60, 54, 48, 42, 36, 30, 24, 18, 12, 6, 0. |
| (2) | 91, 85, 79, 73, 67, 61, 55, 49, 43, 37, 31, 25, 19, 13, 7, 1. |
| (3) | 92, 86, 80, 74, 68, 62, 56, 50, 44, 38, 32, 26, 20, 14, 8, 2. |
| (4) | 93, 87, 81, 75, 69, 63, 57, 51, 45, 39, 33, 27, 21, 15, 9, 3. |
| (5) | 94, 88, 82, 76, 70, 64, 58, 52, 46, 40, 34, 28, 22, 16, 10, 4. |
| (6) | 95, 89, 83, 77, 71, 65, 59, 53, 47, 41, 35, 29, 23, 17, 11, 5. |

It will be seen that the user of the apparatus in accordance with the invention may achieve any integer value of any angle between 0 and 360 degrees. It will further be seen that because (1) the set screw 50 is utilized only to hold the cutting plate or insert 44 against the step 47 and because (2) the nut 57 has a beveled surface 59 for cooperation with the recess 26 of the cutter assembly 40, the insert 44 may be replaced by an operator after removal of the head assembly 40 and then the head assembly may be replaced in exactly the same angular orientation that it was in previously. This is of major significance where frequency cutter 44 replacements are necessary. In the prior art of the apparatus the loosening of the means for securing the cutter 44 normally resulted in the assembly coming completely apart and made it substantially more difficult to reassemble the apparatus in precisely the same angular orientation.

It will also be understood that the index mark 36 on the body portion 12 cooperates with the index marks 49 on the head assembly. The index marks 49 are ordinarily provided with numerical designations of the angle thereof as described above. These numerical designations ordinarily are quite small and thus have been omitted from the drawing.

The invention has been described with reference to its illustrated preferred embodiment. Persons skilled in the art of constructing lathe tool assemblies may, upon exposure to the teachings herein, conceive variations in the mechanical development of the components therein. Such variations are deemed to be encompassed by the disclosure, the invention being delimited only by the appended claims.

The inventor claims:

1. A cutting tool which comprises:
   a. an elongated body member having a generally rectangular cross-section;
   b. said elongated body member having a head end having a step shaped upper surface thereon;
   c. said step shaped upper surface being of generally circular configuration and containing a plurality of generally radially extending ribs disposed at equal angular increments thereabout;
   d. said radially extending ribs on said step shaped upper surface extending through an arc of 360 degrees;
   e. said head end containing a first circular recess adjacent and below said step shaped upper surface and a second circular recess of smaller diameter extending below the first circular recess;
   f. said head end further containing a central bore extending through the head portion and axially aligned with both said first circular recess and said second circular recess;
   g. said head end further containing a third recess extending around the lower extremity of said central bore;
   h. said elongated body member having an arcuate recess adjacent said step shaped upper surface;
   i. a first head assembly having a lower extremity including a lower surface of generally circular configuration having a plurality of generally radially extending ribs disposed at equal angular increments thereabout;
   j. said radially extending ribs on the lower surface of said first head member extending through an arc of 360 degrees;
   k. said ribs of said first head assembly and said ribs of said body portion having the same circular spacing therebetween;
   l. said first head assembly having an upper extremity including a step member and a retaining plate member which is disposed above and separated from the step member;
   m. said upper portion of said first head assembly accommodating a cutting member in the space between said step member and said retaining plate;
   n. said cutting member being secured within said first head assembly by means of a set screw extending through said retaining plate to tighten it against said cutting member and said step member;
   o. said first head assembly further having a circular boss extending from the inner area of its lower surface;
   p. said first head assembly further having a threaded stud extending from the central area of its lower surface; and
   q. said first head assembly being retained on the head end of said elongated body member such that said ribs of said first head assembly are interengaged with said ribs of said body portion, said boss is accommodated within said first circular recess, said first head assembly is accommodated within said arcuate recess of said body member at one portion and disposed such that said cutting member extends outwardly away from said body portion, and said first head assembly is retained within said head portion by extending said threaded stud through said first and said second recess and said central bore and tightening said first head assembly by means of a nut threaded onto said stud and thightened so as to be accommodated within said third recess;
   r. whereby the entire first head assembly may be rotated to any desired degree relative to the body member by loosening said nut, disengaging said two sets of ribs, rotating the first head assembly by the desired amount, re-engaging said two sets of ribs, and then retightening said nut, and further said cutting member may be adjusted or replaced without moving said first head assembly by loosing said set screw to loosen said retaining plate, adjusting or replacing said cutting member, and then tightening said set screw to force said retaining plate against said cutting member.

2. The invention as defined in claim 1 wherein the contour of said step member may vary in order to accept a cutting member of different shapes.

3. The invention as defined in claim 1 wherein said retainer plate is provided with a key which cooperates with a keyway in the upper surface of said head assembly.

4. The apparatus as defined in claim 1, further comprising a reference mark on said body portion and a plurality of discrete spaced indicia disposed on said first head assembly to permit precise alignment therebetween in a plurality of predetermined positions.

5. The invention as defined in claim 4 wherein said indicia are degree marks separated by an equal number of degrees throughout and each of said indicia corresponds to a space between each of said ribs on the lower surface of the head assembly.

6. The invention as defined in claim 5 wherein said degree marks extend from 0 to 144 degrees, each degree mark corresponds to 6 degree increments beginning with 0 degrees, and each degree mark corresponds to a space between each of said ribs in the head assembly which also are separated by a 6 degree increment.

7. The invention as defined in claim 6 wherein the spacing are 3 degrees apart.

8. The invention as defined in claim 5 wherein said first head assembly is interchangeable with a multiplicity of comparable head assemblies, each of which is configured identical to the first head assembly but each of which has a different set of degree marks associated with each of said spaces between each of said ribs on the lower surface of the head assembly.

9. The invention as defined in claim 8 wherein said first head assembly is interchangeable with a multiplicity of comparable head assemblies, each of which is configured identical to the first head assembly but each of which has a different set of degree marks which are offset by one degree from the prior head assembly, whereby the degree marks in each assembly are spaced 6 degrees apart and correspond to a space between each of said ribs in the head assembly which also are 6 degrees apart, and the entire set of head assemblies thereby enables the tool user to interchange head assemblies to achieve any desired degree from 0 degrees to 360 degrees relative to the reference mark on said body portion.

10. The invention as defined in claim 9 wherein the spacings are 3 degrees apart.

11. The invention as defined in claim 9 wherein some of the head assemblies are designed for a left handed tool and some of the head assemblies are designed for a right handed tool.

* * * * *